US008077351B2

(12) United States Patent
Kobashigawa

(10) Patent No.: US 8,077,351 B2
(45) Date of Patent: Dec. 13, 2011

(54) IMAGE FORMING APPARATUS AND METHOD USING DENSITY TEST PATTERNS TO ADJUST PROCESS PARAMETERS AND SUBSEQUENTLY UPDATE GRADATION CORRECTION DATA

(75) Inventor: Kei Kobashigawa, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 559 days.

(21) Appl. No.: 12/328,640

(22) Filed: Dec. 4, 2008

(65) Prior Publication Data

US 2009/0147291 A1 Jun. 11, 2009

Related U.S. Application Data

(60) Provisional application No. 60/992,931, filed on Dec. 6, 2007, provisional application No. 60/992,932, filed on Dec. 6, 2007.

(51) Int. Cl.

| | |
|---|---|
| ***H04N 1/407*** | (2006.01) |
| ***H04N 1/50*** | (2006.01) |
| ***H04N 1/29*** | (2006.01) |
| ***G06K 15/14*** | (2006.01) |
| ***B41J 2/41*** | (2006.01) |
| ***B41J 2/52*** | (2006.01) |
| ***B41J 2/525*** | (2006.01) |

(52) U.S. Cl. ....... 358/1.9; 358/3.21; 358/3.23; 358/504; 358/521; 358/523; 358/300; 347/118; 347/131; 399/9; 399/46; 399/49; 399/72

(58) Field of Classification Search .................. 358/1.9, 358/3.21, 3.23, 504, 521, 523, 406, 300; 347/115, 118, 131, 232, 240, 251–254; 399/9, 399/15, 46, 49, 50, 51, 53, 55, 58, 59, 60, 399/66, 72, 27–30

See application file for complete search history.

(56) References Cited

U.S. PATENT DOCUMENTS

| | | | | |
|---|---|---|---|---|
| 6,147,698 | A * | 11/2000 | Zable et al. | 347/240 |
| 7,349,124 | B2 * | 3/2008 | Zuber | 358/1.9 |
| 7,747,182 | B2 * | 6/2010 | Kato et al. | 399/30 |
| 7,809,291 | B2 * | 10/2010 | Takeuchi et al. | 399/27 |
| 7,911,645 | B2 * | 3/2011 | Sagimori | 358/1.9 |

* cited by examiner

*Primary Examiner* — Scott A Rogers
(74) *Attorney, Agent, or Firm* — Turocy & Watson, LLP

(57) ABSTRACT

An image forming apparatus that forms a color image includes: a sensor that detects a density of an image formed on the transfer body; a density adjusting unit that forms a density test pattern on a transfer body and that adjusts process parameters such that a density of the density test pattern on the transfer body falls within a predetermined range of a reference density; and a gradation adjusting unit that forms a gradation test pattern on the transfer body and updates the gradation correction data such that a density for every gradation of the gradation test pattern on the transfer body falls within a predetermined range of a reference gradation density acquired and stored beforehand. The gradation adjusting unit updates the gradation correction data subsequently after the density adjusting unit adjusts the density of the density test pattern.

20 Claims, 13 Drawing Sheets

IMAGE FORMING APPARATUS AND METHOD USING DENSITY TEST PATTERNS TO ADJUST PROCESS PARAMETERS AND SUBSEQUENTLY UPDATE GRADATION CORRECTION DATA

CROSS-REFERENCE TO RELATED APPLICATIONS

This application is based upon and claims the benefit of priority from U.S. provisional application 60/992,931 and 60/992,932, each filed on Dec. 6, 2007, and the entire contents of each of which are incorporated herein by reference.

TECHNICAL FIELD

The present invention relates to an image forming apparatus and an image forming method and in particular, to an image processing apparatus and an image processing method for forming a color image.

BACKGROUND

In general, the density of a print image may change with a change in ambient environment, such as temperature, or the progress of operating time in an image forming apparatus that prints an image on paper, such as a printer or a copying machine.

Accordingly, a known image forming apparatus, in many cases, forms a predetermined test pattern on an image carrier, such as a photoconductor or a transfer belt, and performs a density adjustment such that the density of the density test pattern falls within a predetermined reference range. For example, the density of the density test pattern formed on the image carrier is detected by a density sensor and adjustments of charged potential, development potential, exposure amount, and the like of the photoconductor are performed such that the detected density falls within a reference range. Usually, in such a density adjustment, a maximum gradation value or a value close to maximum gradation value is set as a set gradation value of the density test pattern in many cases. The density test pattern in this case is a so-called “solid pattern” or an equivalent pattern to the “solid pattern”. Therefore, the density adjustment is performed such that the maximum value of image data becomes a suitable print density.

The gradation characteristic from the maximum density to the minimum density also changes with the change in ambient environment, such as temperature, or the progress of operating time. The gradation is realized by selecting a plurality of gradation patterns with different densities according to the set gradation value, and the relationship between a level of denseness of a gradation pattern and the density obtained by printing is generally nonlinear. In order to correct this non-linearity, correction data called a gradation correction table is often used. The linearity of the characteristic (that is, gradation characteristic) between a gradation value of image data and the print density can be secured by interposing the gradation correction table between the gradation value of image data and a gradation value for selecting a gradation pattern.

However, the linearity of the gradation characteristic is also influenced by the intermediate density changing due to the temperature, operating time, and the like as described above. In order to maintain the linearity of the gradation characteristic, it is necessary to change and update the gradation correction table. An adjustment on the change and update is called a gradation adjustment separately from the density adjustment.

In a known gradation adjustment, first, a gradation test pattern gradually changing from low density to high density is printed on paper, next, the printed gradation test pattern is read with a scanner provided in an image forming apparatus, then, a gradation correction table is changed such that the density for every read gradation falls within a predetermined reference range. The gradation adjustment may be performed not only by a serviceman but also by a normal user. However, the work of printing a gradation test pattern on paper and reading the printed paper with the scanner is troublesome for a normal user. In practice, the work is rarely performed.

Moreover, in a known image forming apparatus, the density adjustment and the gradation adjustment are provided as separate functions, and the adjustments may be performed separately. However, a general gradation adjustment is performed by changing the shape of the gradation characteristic between the maximum gradation value and the minimum gradation value by changing the gradation correction table in order to maintain the linearity. Accordingly, when the maximum density corresponding to the maximum gradation value largely deviates from a proper value, it is not possible to set a desired gradation by change of the gradation correction table.

SUMMARY

Therefore, in view of the above situation, it is an object of the invention to provide an image forming apparatus and an image forming method of adjusting a desired density and a desired gradation simultaneously and accurately without giving an operation burden to a user.

In order to achieve the above object, according to an aspect of the invention, an image forming apparatus that forms a color image by overlapping a plurality of colors includes: a scanner that reads a document and generates image data; an image processing unit that corrects gradation of the image data using gradation correction data and generates a gradation image of the image data with gradation after correction; a plurality of photoconductors corresponding to the plurality of colors; a plurality of charging units that electrically charge the plurality of photoconductors with a predetermined charged potential; a plurality of exposure units that expose the plurality of photoconductors with a predetermined exposure amount; a plurality of development units that develop the plurality of photoconductors with a predetermined development potential; a developer included in each of the plurality of the development units; a transfer body onto which images corresponding to the plurality of colors formed on the plurality of photoconductors are transferred; a plurality of transfer units that transfer the images corresponding to the plurality of colors from the plurality of photoconductors onto the transfer body; a sensor that detects a density of an image formed on the transfer body; a density adjusting unit that forms a predetermined density test pattern on the transfer body and that adjusts process parameters including more than or equal to two among the charged potential, the exposure amount, the development potential, and a toner concentration in the developer such that a density of the density test pattern on the transfer body detected by the sensor falls within a predetermined range of a reference density; and a gradation adjusting unit that forms a gradation test pattern having a plurality of gradation levels on the transfer body and updates the gradation correction data such that a density for every gradation of the gradation test pattern on the transfer body detected by the sensor falls within a predetermined range of a reference gradation density acquired and stored beforehand. The gradation adjusting unit updates the gradation correction data subsequently after the density adjusting unit adjusts the density of the density test pattern.

In addition, according to another aspect of the invention, an image forming method of forming a color image by overlapping a plurality of colors includes: reading a document to generate image data by a scanner; correcting gradation of the image data using gradation correction data and generating a gradation image of the image data with gradation after correction; electrically charging a plurality of photoconductors corresponding to the plurality of colors with a predetermined charged potential; exposing the plurality of photoconductors with a predetermined exposure amount; developing the plurality of photoconductors with a predetermined development potential; transferring, onto a transfer body, images corresponding to the plurality of colors formed on the plurality of photoconductors; detecting a density of an image formed on the transfer body using a sensor; adjusting the density of the density test pattern by forming a predetermined density test pattern on the transfer body and adjusting a process parameters including more than or equal to two among the charged potential, the exposure amount, the development potential, and a toner concentration in a developer such that the density of the density test pattern on the transfer body detected by the sensor falls within a predetermined range of a reference density; and forming a gradation test pattern having a plurality of gradation levels on the transfer body and updating the gradation correction data such that a density for every gradation of the gradation test pattern on the transfer body detected by the sensor falls within a predetermined range of a reference gradation density acquired and stored beforehand.

DETAILED DESCRIPTION

An image processing apparatus and an image processing method according to embodiments of the invention will be described with reference to the accompanying drawings.

(1) Configuration

Figure 1:
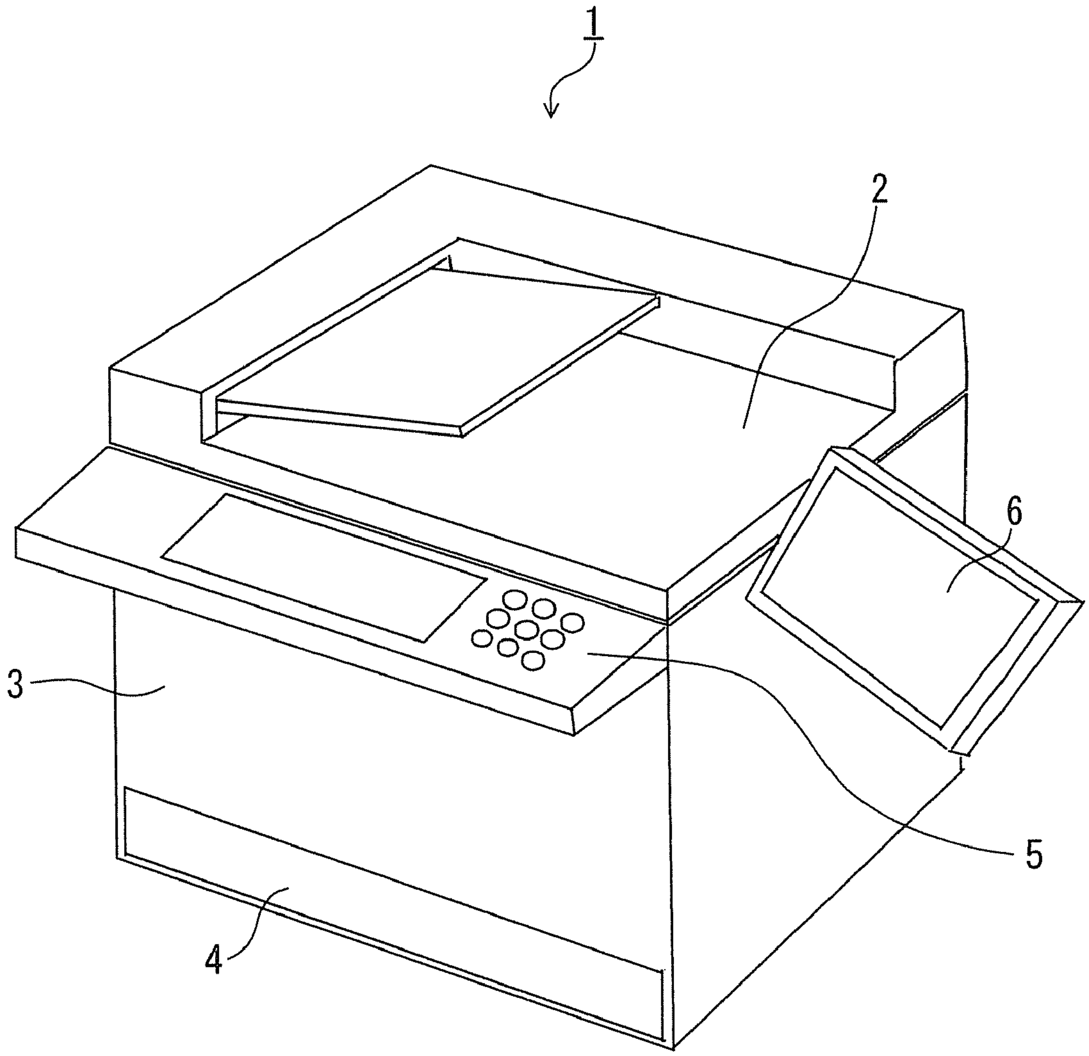
FIG. 1 is a view illustrating an example of the outer appearance of an image forming apparatus according to the present embodiment.

FIG. 1 is a view illustrating an example of the outer appearance of a copying machine (or a MFP) as a typical example of an image forming apparatus 1 according to the present embodiment.

The image forming apparatus 1 includes a scanner 2, an image forming unit 3, a paper feed unit 4, and the like.

The scanner 2 optically reads a document placed on a document platen or a document input to an ADF (auto document feeder) and generates image data.

The image forming unit 3 prints image data on paper supplied from the paper feed unit 4 using an electrophotographic method. In addition, a control panel 5 used when a user performs various operations and a display panel 6 which displays various kinds of information are provided in the image forming unit 3.

Figure 2:
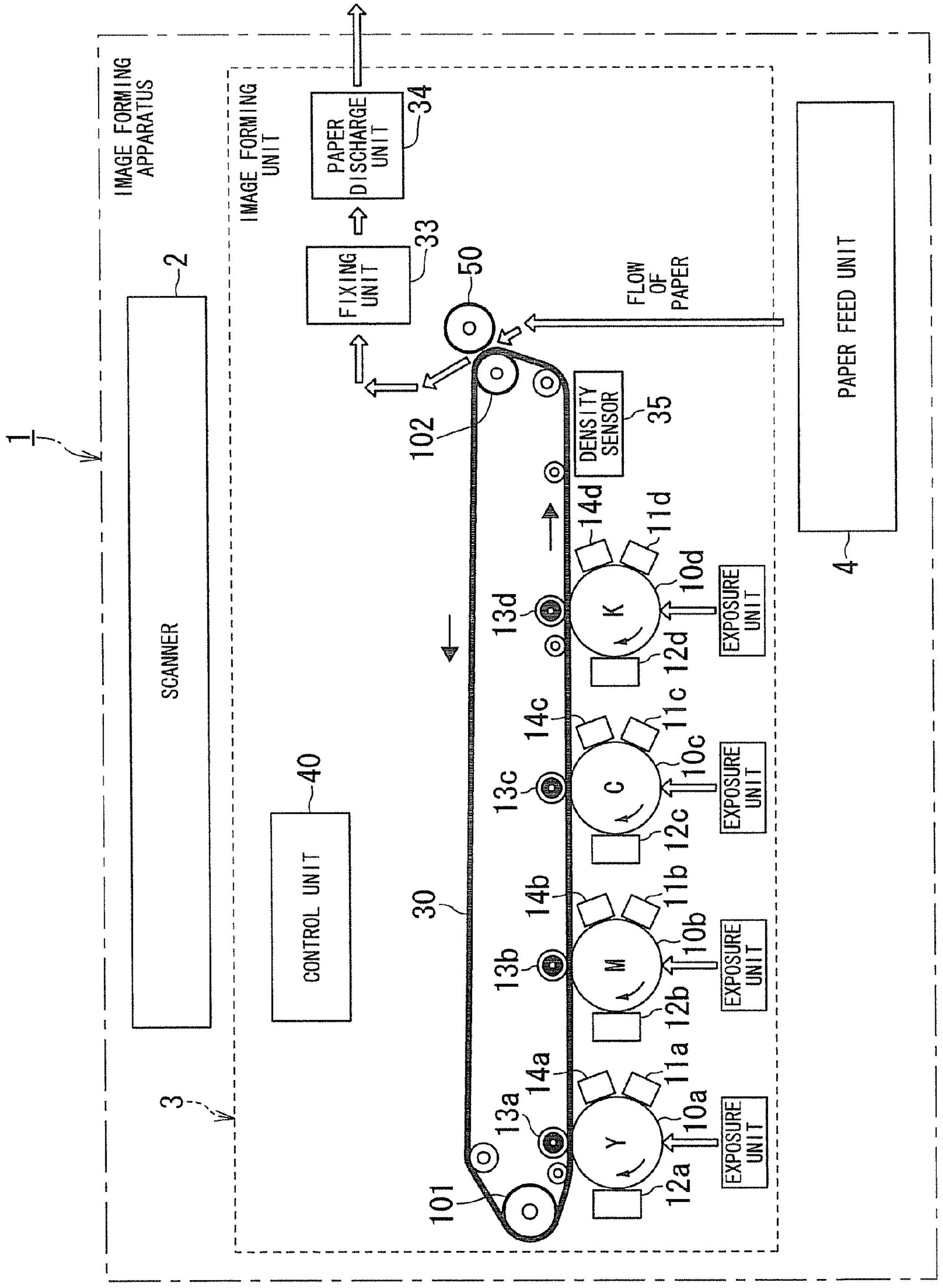
FIG. 2 is a view illustrating an example of the configuration of the image forming apparatus.

FIG. 2 is a cross-unital view schematically illustrating an example of the internal configuration of the image forming unit 3. The image forming apparatus 1 according to the present embodiment has a configuration in which color printing can be performed by a so-called tandem type electrophotographic method.

As shown in FIG. 2, four photoconductive drums (photoconductors) 10*a* to 10*d* corresponding to four colors of yellow (Y), magenta (M), cyan (C), and black (K) are disposed along the transport direction of a transfer belt (transfer body) 30. Around each photoconductive drum 10, charging units 11*a* to 11*d*, developing units 12*a* to 12*d*, transfer rollers (transfer units) 13*a* to 13*d*, cleaners 14*a* to 14*d*, and the like are disposed in order from an upstream side of rotation toward a downstream side. In addition, exposure units 15*a* to 15*d* that irradiate laser beams onto the photoconductive drums (photoconductors) 10*a* to 10*d* are provided for every color. Here, alphabetic characters of a, b, c, and d given to the reference numbers of the constituent components correspond to print colors Y, M, C, and K, respectively.

The charging units 11*a* to 11*d* uniformly charge surfaces of the photoconductive drums 10*a* to 10*d* by the charged potential set by a control unit 40. Then, the exposure units 15*a* to 15*d* irradiate laser beams, which are subjected to pulse width modulation according to a level of image data of each color of Y, M, C, and K, onto the surfaces of the photoconductive drums 10*a* to 10*d* for respective colors. When the laser beams are irradiated, the electric potential of the corresponding portion is lowered and an electrostatic latent image is formed on each of the surfaces of the photoconductive drums 10*a* to 10*d*.

The developing units 12*a* to 12*d* develop electrostatic latent images on the photoconductive drums 10*a* to 10*d*, respectively, with toner corresponding to each color. By this development, toner images corresponding to colors of Y, M, C, and K are formed on the photoconductive drums 10*a* to 10*d*.

The transfer belt 30 is stretched over a driving roller 101 and an opposite secondary transfer roller 102 in the shape of a loop and is continuously rotated in a direction indicated by arrow by driving of the driving roller 101.

While the transfer belt 30 is passing through nipping portions formed by the photoconductive drums 10*a* to 10*d* and the transfer rollers 13*a* to 13*d*, the toner images corresponding to colors of Y, M, C, and K are sequentially transferred onto an outer peripheral surface of the transfer belt 30.

First, the Y toner image is transferred from the photoconductive drum 10*a* to the transfer belt 30 at the position (transfer position of Y) where the photoconductive drum 10*a* for Y and the transfer roller 13*a* for Y face each other.

Then, the M toner image is transferred from the photoconductive drum 10*b* to the transfer belt 30 at the position (transfer position of M) where the photoconductive drum 10*b* for M and the transfer roller 13*b* for M face each other. At this time, the M toner image is transferred to overlap the Y toner image already transferred on the outer peripheral surface of the transfer belt 30.

Then, similarly, the C toner image and the K toner image are sequentially transferred onto the outer peripheral surface of the transfer belt 30. As a result, a full-color toner image is formed on the transfer belt 30. The full-color toner image reaches a nipping portion (secondary transfer position), which is formed by a secondary transfer roller 50 and the opposite secondary transfer roller 102 by movement of the transfer belt 30.

In contrast, when forming a density test pattern or a gradation test pattern on a transfer belt, test patterns of respective colors are transferred not to overlap each other, which will be described in detail later.

A density sensor 35 for detecting the density of the toner image transferred onto the transfer belt 30 is disposed at the most downstream side (downstream side of the photoconductive drum 10*d*) of the transfer belt 30.

Meanwhile, paper picked up from the paper feed unit 4 is transported up to the secondary transfer position by a transport unit (not shown). Then, the full-color toner image on the transfer belt 30 is transferred onto paper at the secondary transfer position. The full-color toner image is heated and pressed by a fixing unit 33 to be fixed on the paper. Then, the paper is discharged to the outside of the image forming apparatus 1 by a paper discharge unit 34.

Toner remaining on the surfaces of the photoconductive drums 10*a* to 10*d* after transferring to the transfer belt 30 is completed is removed by the cleaners 14*a* to 14*d* so that printing on the next paper can be prepared. Continuous full-color printing can be performed by repeating such processing.

The control unit 40 of the image forming unit 3 not only makes an overall control of the image forming apparatus 1 but also performing a density adjustment or a gradation adjustment. With regard to the density adjustment of those adjustments, the control unit 40 sets respective charged potentials for the charging units 11*a* to 11*d*, respective development potentials for the developing units 12*a* to 12*d*, respective transfer potentials for the transfer rollers (transfer units) 13*a* to 13*d*, and respective exposure amounts for the exposure units 15*a* to 15*d*. When a two-component developer is used, the control unit 40 also sets "toner concentration in the two-component developer" (hereinafter, just referred to as "toner concentration").

Figure 3:
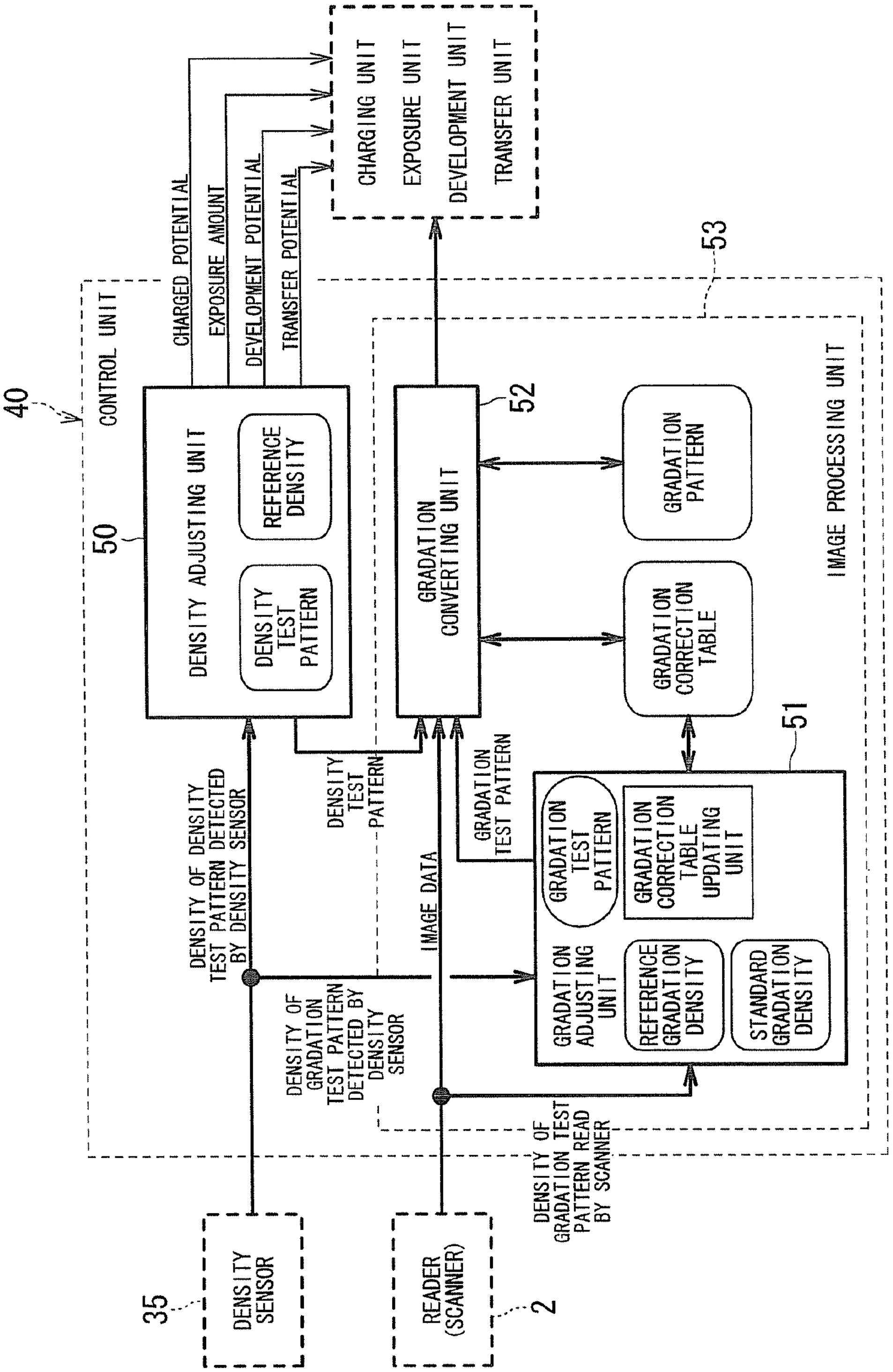
FIG. 3 is a block diagram illustrating an example of the configuration mainly related to density adjustment and gradation adjustment.

FIG. 3 is a block diagram illustrating the configuration particularly related to the density adjustment or the gradation adjustment of the detailed configuration of the control unit 40.

The control unit 40 includes a density adjusting unit 50, a gradation adjusting unit 51, a gradation converting unit 52, and the like.

The density adjusting unit 50 stores a density test pattern and reference density data in an internal storage unit. As the density test pattern, a so-called solid pattern corresponding to the maximum density is generally used. When performing the density adjustment, the density test pattern is read and a toner image of the density test pattern of each color is formed on the transfer belt 30. The density of the density test pattern is detected by the density sensor 35 and is input to the density adjusting unit 50.

The density adjusting unit 50 compares the detected density with the reference density and makes a determination. If the detected density is outside a predetermined range of the reference density, the density adjusting unit 50 adjusts more than or equal to two among a charged potential, a development potential, an exposure amount, and a toner concentration (if the two-component developer is used) so that the detected density falls within the predetermined range. Here, parameters used to determine the density, such as the charged potential, the development potential, the exposure amount, and the toner concentration are called process parameters.

The gradation adjusting unit 51 stores a gradation test pattern, a standard gradation density, and a reference gradation density in an internal storage unit.

The gradation test pattern is a test pattern with a plurality of gradation levels from a lowest gradation level (white color in the case of monochrome) to a highest gradation level (black color in the case of monochrome). The gradation adjusting unit 51 usually has a gradation test pattern for every color.

When performing the gradation adjustment (second gradation adjustment to be described later), the gradation adjusting unit 51 reads a gradation test pattern and forms a toner image of the gradation test pattern corresponding to each color on the transfer belt 30. The density of the gradation test pattern is detected by the density sensor 35 and is input to the gradation adjusting unit 51.

The gradation adjusting unit 51 changes and updates the gradation correction table (gradation correction data) such that the density for every gradation in the gradation test pattern detected on the transfer belt 30 falls within the predetermined range of the reference gradation density acquired and stored beforehand.

Figure 4A:
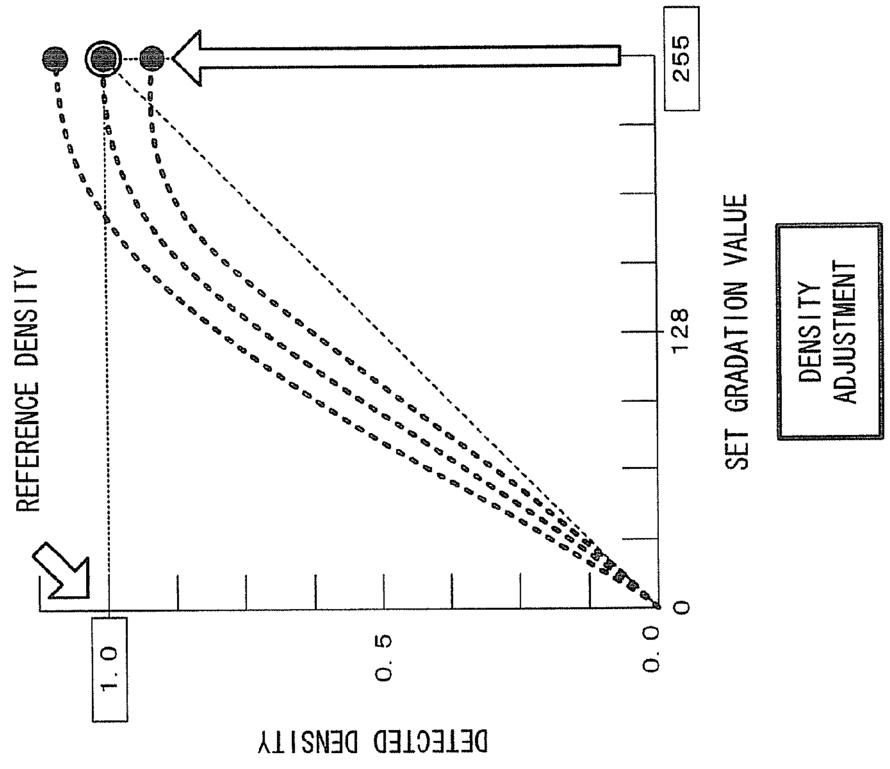
FIG. 4A is a view illustrating the concept of density adjustment.
Figure 4B:
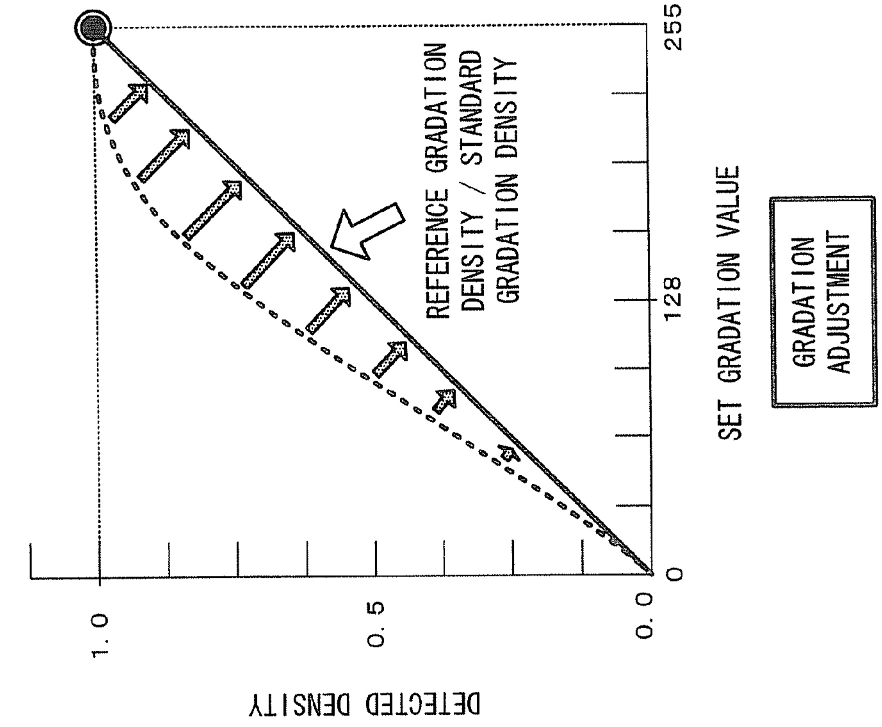
FIG. 4B is a view illustrating the concept of gradation adjustment.

FIG. 4A is a view illustrating the concept of a density adjustment in the image forming apparatus 1 according to the present embodiment, and FIG. 4B is a view illustrating the concept of a gradation adjustment.

In FIGS. 4A and 4B, horizontal axes indicate levels of gradation set in image data or a test pattern. In this example, an 8-bit gradation data width is assumed, thus gradation levels are ranged from 0 to 255. In FIGS. 4A and 4B, vertical axes indicate the detection density normalized by the reference density.

In the density adjustment, one gradation level is usually set as gradation set in the density test pattern. In general, the maximum gradation level or a gradation level close to the maximum gradation level is set. The density test pattern is transferred onto the transfer belt 30, and the density sensor 35 detects the density of the density test pattern. Then, process parameters, such as the charged potential, the development potential, the exposure amount, and the toner concentration are adjusted so that the detected density falls within the predetermined range with respect to the 'reference density'.

By the density adjustment, an adjustment is made such that the density corresponding to the maximum gradation level matches the 'reference density'.

On the other hand, the gradation characteristic which indicates the relationship between the set gradation value and the intermediate density is generally nonlinear. In many cases, to obtain the gradation, a gradation pattern is selected among a set of gradation patters in response to the set gradation value. In each of the gradation patters, the denseness (for example, a distance between a plurality of thin lines) is assigned according to the set gradation value. Then printing is performed with the selected gradation pattern.

However, it is known that the relationship between the set gradation value and the density of the printed gradation pattern shows nonlinear characteristic if the denseness of the gradation pattern is simply proportional to the set gradation value. The gradation characteristic shown by a dotted line in FIG. 4B is an example of the nonlinear characteristic before correction.

To make correction such that the nonlinear relationship becomes the linear relationship is gradation conversion processing. In the correction of the gradation characteristic, the set gradation value is corrected by using the gradation correction table (gradation correction data), for example. Then, a gradation pattern with the denseness corresponding to an output value (gradation value after correction) of the gradation correction table is selected and printed.

Figure 5:
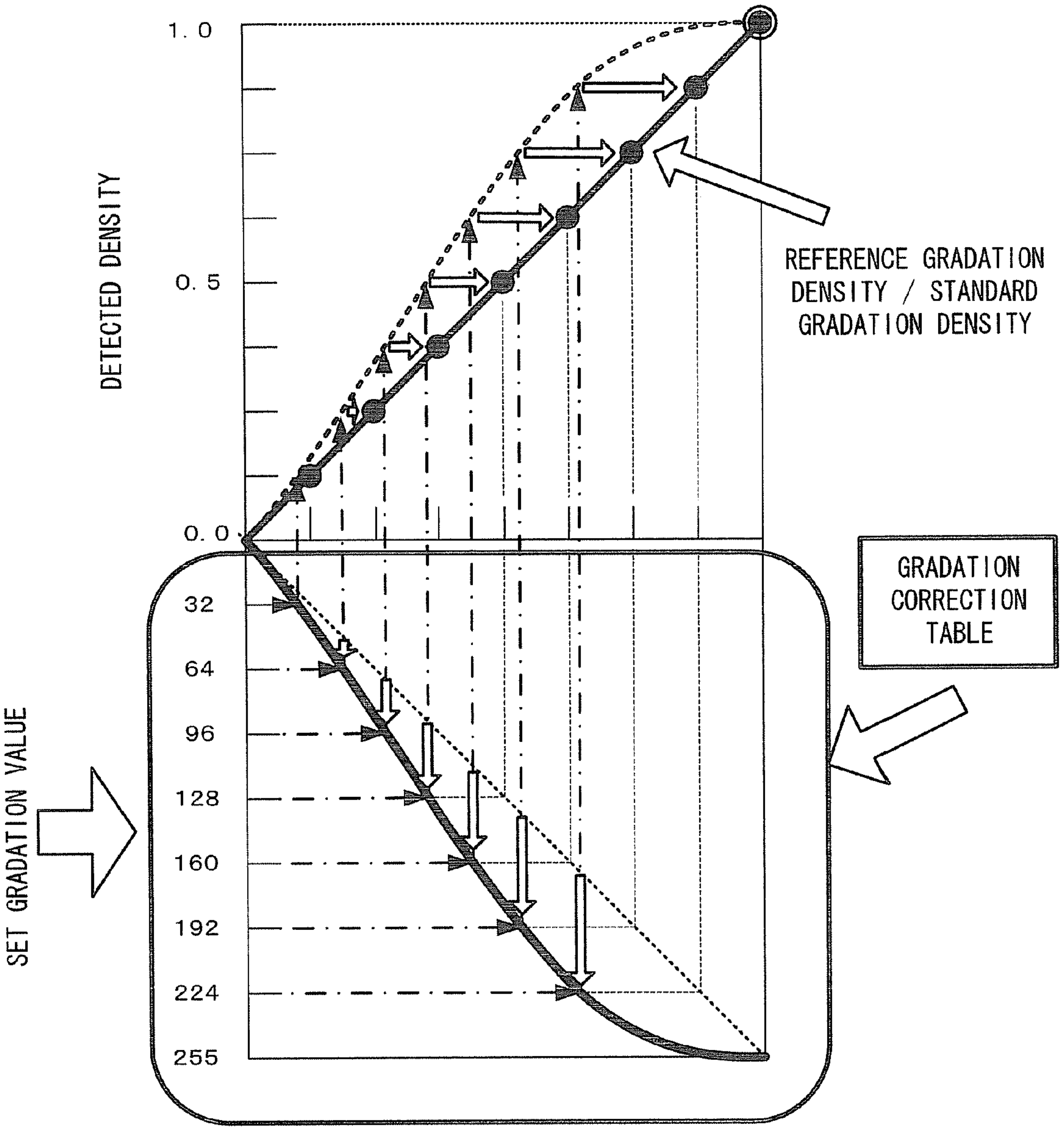
FIG. 5 is a view illustrating a gradation correction table generated or updated by gradation adjustment and the concept of gradation conversion processing using the table.

FIG. 5 is a view illustrating the concept of a gradation adjustment using the gradation correction table. A curve shown by a heavy line in a lower part of FIG. 5 is a view illustrating the characteristic of the gradation correction table. The shape of the characteristic of the gradation correction table is, for example, a shape axisymmetrical with respect to the shape of the gradation characteristic (curve indicated by a dotted line in information of FIG. 5). By using the gradation correction table with such shape, correction can be performed such that the relationship between the set gradation value and the density obtained from the set gradation value becomes linear.

Processing of correcting a set gradation value using the gradation correction table and selecting a gradation pattern with the denseness corresponding to a gradation value after correction is performed in the gradation converting unit 52 of the control unit 40 (refer to FIG. 3).

The gradation adjusting unit 51 performs processing of generating the gradation correction table that the gradation converting unit 52 uses or processing of updating the gradation correction table according to the progress of operating time or the change in ambient environment.

(2) Composite Density and Gradation Adjustments (Manual)

The image forming apparatus 1 according to the present embodiment has an operation mode of composite density and gradation adjustments (manual) in which an operation of a service person or a normal user is required and an operation mode of composite density and gradation adjustments (automatic) in which the operation of the service person or the normal user is not required.

Figure 6:
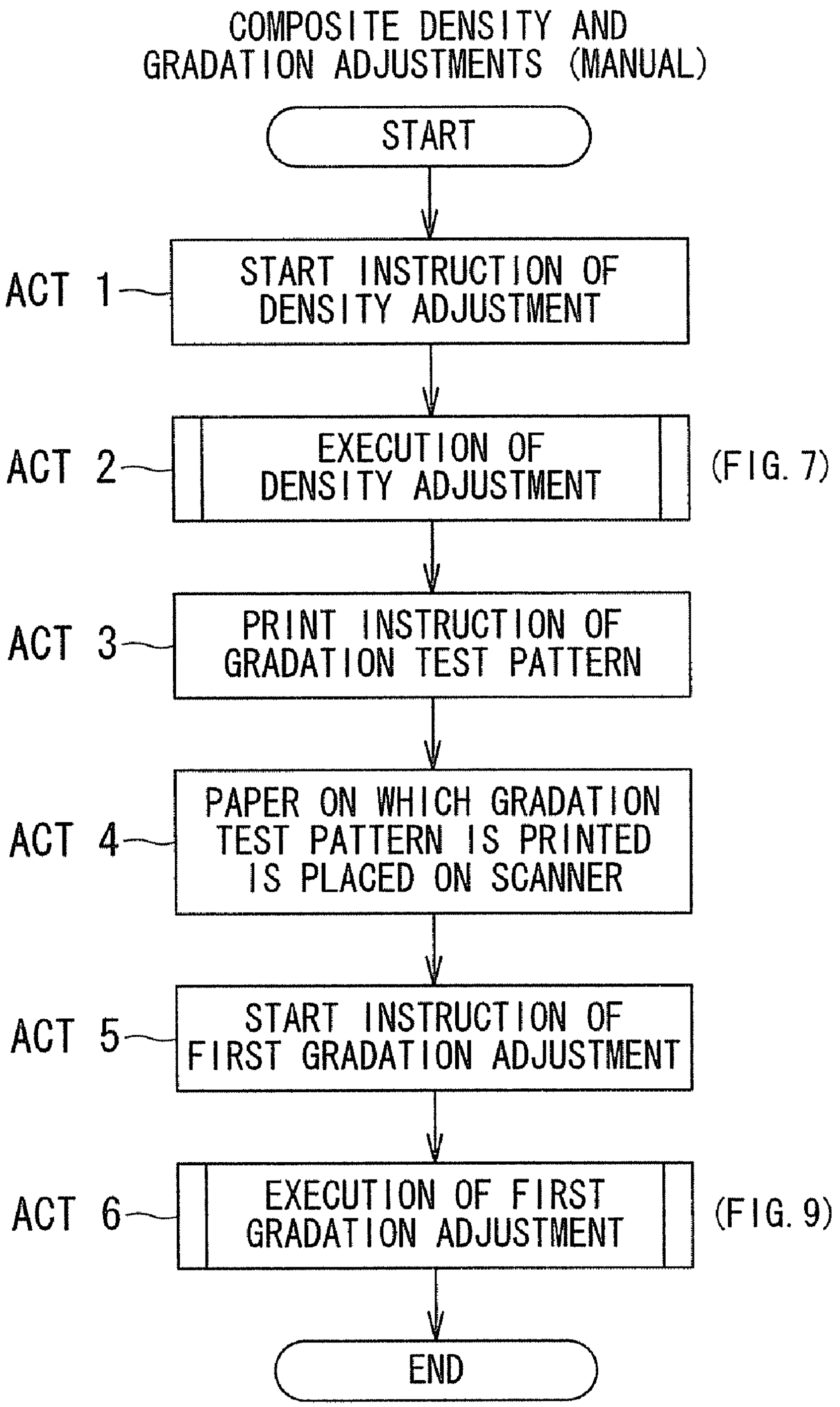
FIG. 6 is a basic flow chart illustrating a processing example of composite density and gradation adjustments (manual) according to the present embodiment.

FIG. 6 is a basic flow chart illustrating a processing example of composite density and gradation adjustments (manual).

In ACT1, a service person or a normal user instructs the image forming apparatus 1 to start a density adjustment.

Figure 7:
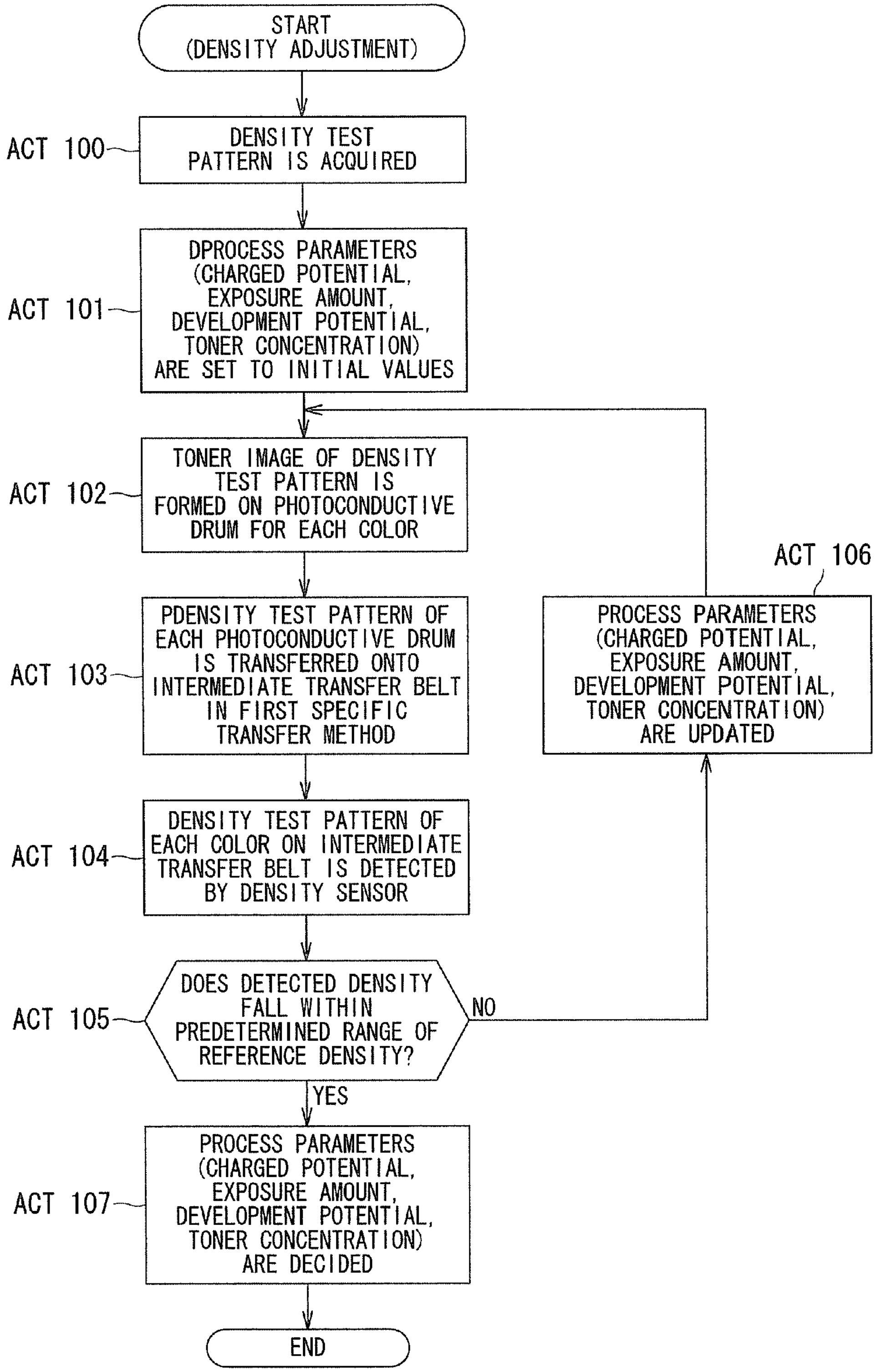
FIG. 7 is a detailed flow chart illustrating a processing example of the density adjustment.

In ACT2, the image forming apparatus 1 which receives the start instruction executes the density adjustment. FIG. 7 is a detailed flow chart illustrating a specific processing example of the density adjustment in ACT2. Processing of the density adjustment is executed mainly by the density adjusting unit 50 of the image forming apparatus 1 as described above.

In ACT100 of FIG. 7, the density adjusting unit 50 reads and acquires a density test pattern stored in the internal storage unit.

In ACT101, process parameters, such as the charged potential, the exposure amount, and the development potential, are set to initial values.

In ACT102, a toner image of the acquired density test pattern is formed on the photoconductive drum for each color.

In ACT103, the toner image of the density test pattern formed on each photoconductive drum is transferred to the transfer belt 30 in a first special transfer method. FIGS. 8A to 8E are views illustrating the first special transfer method.

Figures 8A, 8B, 8C, 8D, 8E:
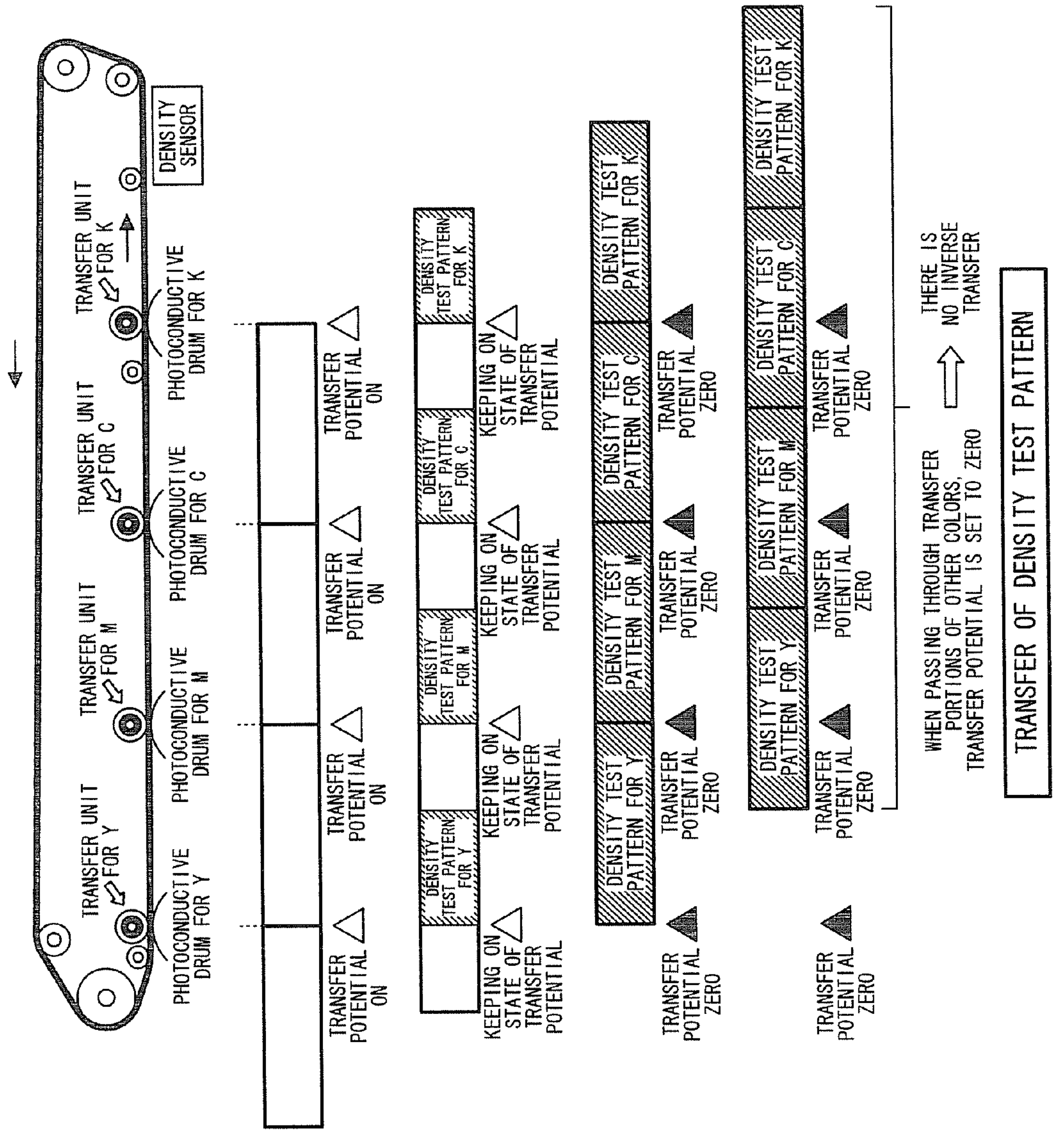
FIGS. 8A to 8E are views illustrating a first special transfer method used in the density adjustment.

In the tandem type image forming apparatus 1, photoconductive drums for respective colors are disposed in series from the upstream side of the transfer belt 30 as shown in FIG. 8A. In the image forming apparatus 1 according to the present embodiment, the photoconductive drums 10*a* to 10*d* for Y, M, C, and K are disposed from the upstream side of the transfer belt 30 to the downstream side thereof.

In general, when forming a full-color image, toner images corresponding to respective colors are transferred onto the transfer belt 30 so as to overlap each other. Accordingly, the start timing of transfer of the toner images for colors positioned at the upstream side is earlier, and the start timing of transfer of the toner images for colors positioned at the downstream side is later.

In contrast, in the first special transfer method, toner images of density test patterns of respective colors are transferred not to overlap each other on the transfer belt 30. This is to detect the densities of the toner images with the density test patterns independently for every color by the density sensor 35.

Moreover, in order to detect the density of a density test pattern as quickly as possible, the transfer potentials of the transfer rollers 13*a* to 13*d* for respective colors are turned on simultaneously as shown in FIG. 8B. Then, as shown in FIG. 8C, the density test patterns of respective colors are simultaneously formed on the transfer belt 30.

The transfer potential while transferring the density test pattern onto the transfer belt 30 is the same as the electric potential in transferring a normal full-color image. For example, a transfer potential of about +400 V to +4000 V, which varies depending on ambient environments such as temperature, humidity, or the like, is applied to each of the transfer rollers 13*a* to 13*d*.

However, in the first special transfer method, the transfer potential is controlled such that the transfer potential of each of the transfer rollers 13*a* to 13*d* becomes a neutral potential, that is, 0 V before the toner image of the density test pattern of each color formed on the transfer belt 30 reaches the adjacent other-color transfer unit (refer to FIGS. 8D and 8E). This is to prevent the density of a density test pattern of its own color from changing due to an influence of process parameters of other colors according to the phenomenon called inverse transfer. The inverse transfer refers to a phenomenon in which a part of toner (for example, Y toner of a Y-color image) of a toner image with its own color formed on the transfer belt 30 is transferred in a direction (opposite direction) from the transfer belt 30 to the photoconductive drums (photoconductive drum for M) for other colors by the transfer potential of the adjacent transfer rollers (for example, the transfer roller for M) for other colors. The amount of toner of the own color transferred at the transfer position of other colors changes depending on not only the transfer potential of the transfer rollers for other colors but also process parameters, such as the charged potential, exposure amount, and development potential for the other colors.

However, in the first special transfer method, occurrence of the inverse transfer is prevented by setting the transfer potential to 0 V before the toner image of the density test pattern of its own color reaches the transfer position of other colors. As a result, since the density of the toner image of the density test pattern for the own color does not change due to the influence of the process parameters of other colors, the density adjustment which is completely independent for every color can be performed.

In ACT104, the density sensor 35 detects the density of the density test pattern for every color formed on the transfer belt 30 in ACT103.

In ACT105, it is determined whether or not the detected density falls within a predetermined range of the reference density. If the detected density is outside the predetermined range of the reference density, the process parameters, such as the charged potential, the exposure amount, the development potential, and the toner concentration (when the two-component developer is used) are changed and adjusted for every color in ACT106. Then, the density test pattern is formed again on the transfer belt 30 using the adjusted process parameters (ACT102) Processing from ACT102 to ACT106 is repeated until the density of the density test pattern of each color falls within the predetermined range of the reference density.

If the density of the density test pattern of each color falls within the predetermined range of the reference density, the process parameter of each color at that time is fixed and stored in a proper storage unit of the density adjusting unit 50 in ACT107.

Thus, in the density adjustment described above, processing for adjusting the process parameters of each color is performed by a feedback control simultaneously and in parallel for each color. In this case, since occurrence of the inverse transfer is prevented by the first special transfer method as described above, a feedback control completely independent for each color becomes possible. As a result, the feedback control can be realized stably and quickly.

After the density adjustment is completed, the gradation adjustment is performed subsequently. In ACT3 of FIG. 6, the service person or the normal user instructs the image forming apparatus 1 to print a gradation test pattern. The image forming apparatus 1 prints a gradation test pattern on paper using the gradation correction table that the image forming apparatus 1 has at the time and outputs the paper.

Then, the service person or the normal user places the paper, on which the gradation test pattern is printed, on the scanner (ACT4) and instructs the image forming apparatus 1 to start a first gradation adjustment (ACTS). In response to the start instruction, the image forming apparatus 1 executes the first gradation adjustment (ACT6).

Figure 9:
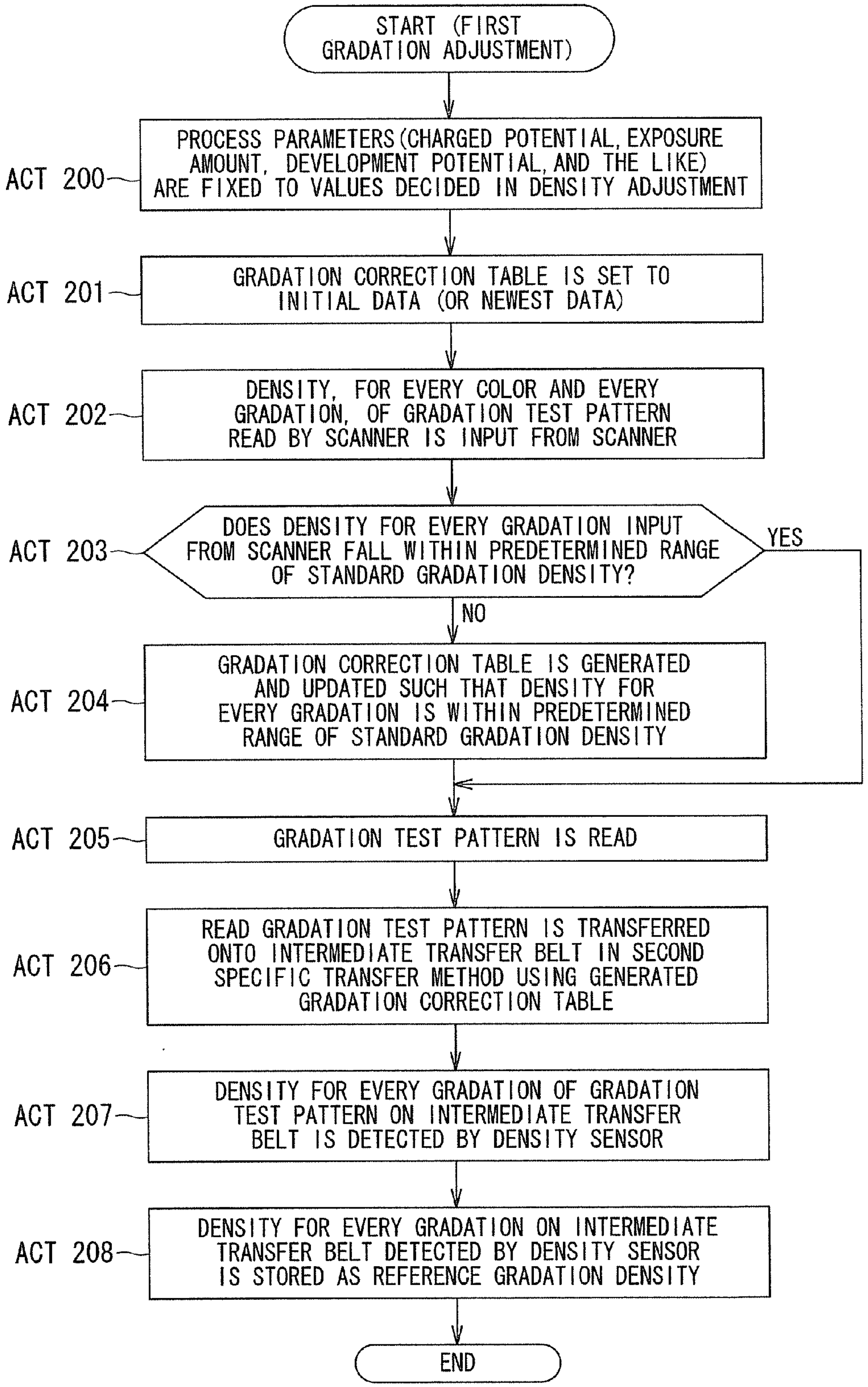
FIG. 9 is a detailed flow chart illustrating a processing example of first gradation adjustment.

FIG. 9 is a detailed flow chart illustrating a specific processing example of the first gradation adjustment. In ACT200, the process parameters, such as the charged potential, the exposure amount, the development potential, and the toner concentration (when the two-component developer is used) are fixed to the values decided in the density adjustment (ACT2 of FIG. 6). The values of the process parameters once decided are not changed during execution of the first gradation adjustment and until the next density adjustment is executed.

In ACT201, the gradation correction table is set as initial data or newest data.

In ACT202, the paper on which the gradation test pattern is printed is read by the scanner, and the density of the gradation test pattern for every color and the density for every gradation acquired by the scanner is input from the scanner to the gradation adjusting unit 51.

In ACT203, it is determined for every color whether or not the density for every gradation input from the scanner falls within a predetermined range of the standard gradation density. The 'standard gradation density' used herein is a gradation characteristic in which the relationship between the density and the set gradation value is linear (proportional relationship) and is data stored in the proper storage unit of the gradation adjusting unit 51.

When the density for every gradation input from the scanner is outside the predetermined range of the standard gradation density, the gradation correction table is generated to fall within the predetermined range and the initial data used in ACT201 is updated (ACT204). The gradation correction table generated in ACT204 is a correction table corresponding to the correction curve illustrated in the lower part of FIG. 5.

Although the substantial density adjustment and gradation adjustment are completed by processing up to ACT204, processing of ACT205 to ACT208 is subsequently performed in the first gradation adjustment. The processing of ACT205 to ACT208 is processing for acquiring 'standard gradation density' data which is required to execute a second gradation adjustment, which will be described later.

In ACT205, the gradation test pattern stored in the proper storage unit of the gradation adjusting unit 51 is read.

In ACT206, the gradation test pattern read in ACT205 is developed to the photoconductive drums 10*a* to 10*d* for respective colors using the gradation correction table generated in ACT204. Then, each of the gradation test patterns on the photoconductive drums 10*a* to 10*d* is transferred onto the transfer belt 30 in a second special transfer method.

FIGS. 10A to 10F are views illustrating the second special transfer method. Similar to the first special transfer method, gradation test patterns of respective colors are simultaneously transferred onto the transfer belt 30 without overlapping each other (refer to FIGS. 10A to 10C). In the second special transfer method, however, even if a toner image of an own color reaches the transfer position of other colors adjacent to the downstream side, the transfer potential of each of the transfer rollers 13*a* to 13*d* is not made to become a neutral potential (0 V) and the normal transfer potential is maintained (refer to FIGS. 10D to 10F) unlike the first special transfer method. That is, the first special transfer method is a transfer method of intentionally avoiding the occurrence of inverse transfer, while the second special transfer method is a transfer method of allowing the occurrence of inverse transfer.

Figures 10A, 10B, 10C, 10D, 10E, 10F:
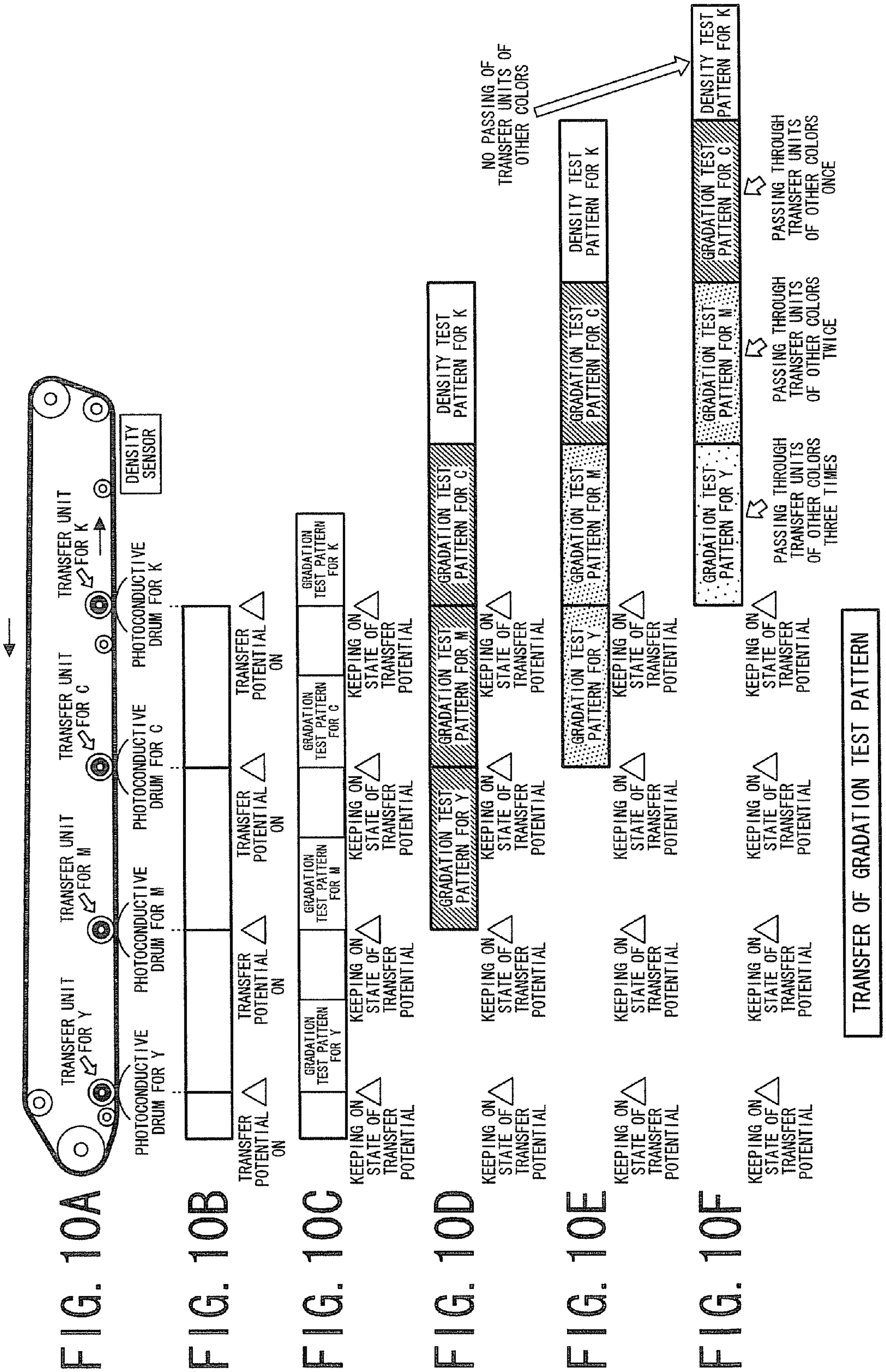
FIGS. 10A to 10F are views illustrating a second special transfer method used in the gradation adjustment.

In the second special transfer method, as shown in FIG. 10F, inverse transfer of the toner image for Y located at the most downstream side occurs three times due to passing through the transfer positions of other colors of M, C, and K three times. In addition, inverse transfer of the toner image for M occurs twice due to passing through the transfer positions of C and K, and inverse transfer of the toner image for C occurs once due to passing through the transfer position of K. However, such inverse transfer is also an event occurring when a normal full-color image is usually generated. The second special transfer method is effective in that the same inverse transfer as the normal transfer method occurs and the density in the gradation test pattern and the density in normal full-color printing are substantially the same.

In the density adjustment using the first special transfer method, since processing for repeatedly making process parameters of respective colors follow the reference value simultaneously and in parallel by a feedback control is performed, it is necessary to prevent the inverse transfer so that the density of each color is not affected by values of the process parameters of other colors. In the first gradation adjustment (and the second gradation adjustment to be described later), however, the gradation correction table is updated by one-time processing. Accordingly, even if the density of each color is affected by the process parameters of other colors due to the inverse transfer, there is no disadvantage. In addition, the gradation adjustment can be performed more accurately due to the transfer environment which is the same as that in the normal full-color printing.

In ACT207 (FIG. 9), the density sensor 35 detects the density, for every color and every gradation, of the gradation test pattern transferred on the transfer belt 30.

Then, in ACT208, the density for every gradation on the transfer belt 30 detected by the density sensor 35 is stored as a 'reference gradation density' for every color in the storage unit of the gradation adjusting unit 51.

(3) Composite Density and Gradation Adjustments (Automatic)

Through the processing of the above-described composite density and gradation adjustments (manual), optimal density and gradation can be obtained at the corresponding point of time and in the corresponding environment. However, as described above, the density or gradation characteristic changes with the progress of operating time or the ambient environment. The composite density and gradation adjustments (automatic) described below is processing for maintaining the density or gradation characteristic once adjusted in an optimal state all the time without troubling a normal user or a service person.

Figure 11:
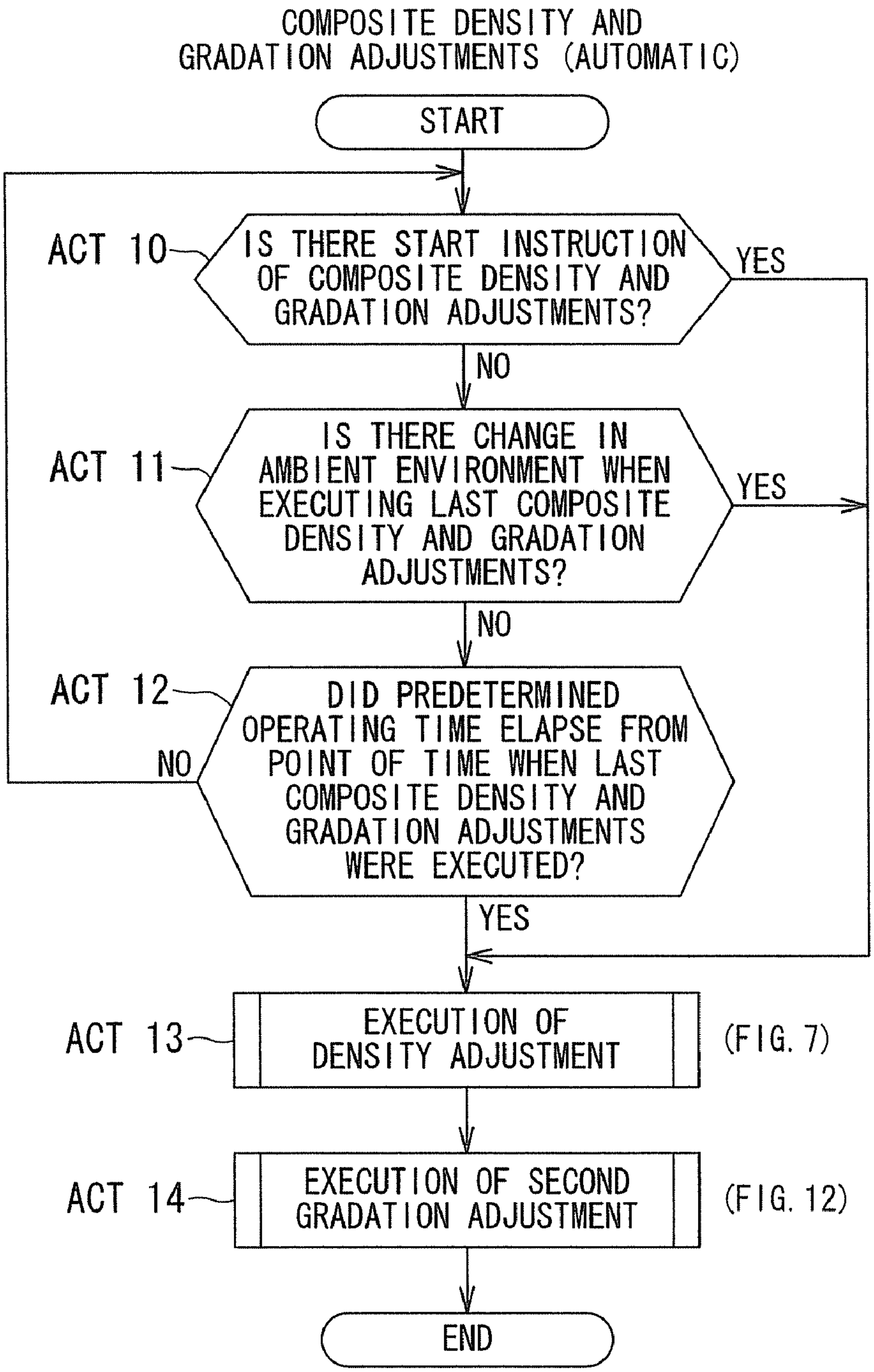
FIG. 11 is a basic flow chart illustrating a processing example of composite density and gradation adjustments (automatic) according to the present embodiment.

FIG. 11 is a basic flow chart illustrating a processing example of composite density and gradation adjustments (automatic).

Processing of ACT10 to ACT12 is processing of determining the trigger for starting the substantial composite density and gradation adjustments (automatic).

In principle, the composite density and gradation adjustments (automatic) start automatically without depending on a person's hand. However, it is preferable that the composite density and gradation adjustments (automatic) can also be started by a manual start instruction of the normal user or the service person. Therefore, in ACT10, it is determined whether or not there is a start instruction of the normal user or the service person. If there is a manual start instruction, the process proceeds to ACT13.

On the other hand, even if there is no manual start instruction, the ambient environment (for example, ambient temperature or ambient humidity) when the composite density and gradation adjustments (automatic or manual) were executed last is compared with a current ambient environment and it is determined whether or not there is a change exceeding a predetermined reference in ACT11. If it is determined that there is a change, the process proceeds to ACT13.

In addition, also when it is determined that there is no change in ambient environment, it is determined whether or not a predetermined operating time elapsed from a point of time when the composite density and gradation adjustments (automatic or manual) were executed last in ACT12. If the predetermined operating time elapsed, the process proceeds to ACT13.

ACT13 is processing of executing a density adjustment. A density test pattern is transferred onto the transfer belt 30 and process parameters of each color are adjusted such that the density of each density test pattern detected by the density sensor 35 becomes the reference density. Since the content of specific processing is the same as the processing described in FIG. 7, a detailed description thereof will be omitted.

In ACT14, the second gradation adjustment is executed subsequently after the density adjustment is completed.

Figure 12:
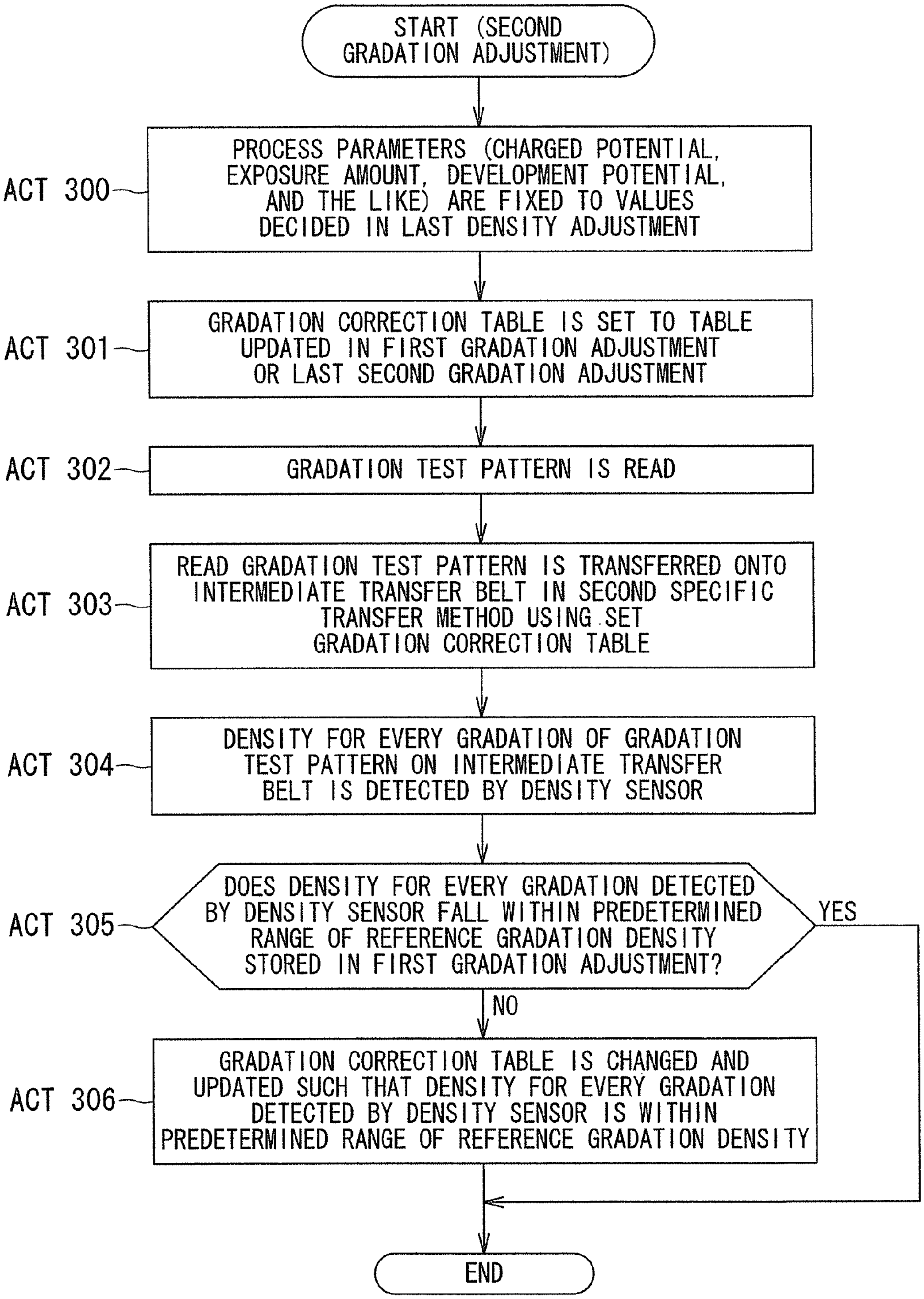
FIG. 12 is a detailed flow chart illustrating a processing example of second gradation adjustment.

FIG. 12 is a detailed flow chart illustrating a specific processing example of the second gradation adjustment.

In ACT300, the process parameters are fixed to the values decided in the last density adjustment (ACT13 of FIG. 11).

In ACT301, a table updated in the first gradation adjustment or the last second gradation adjustment is set as the gradation correction table.

In ACT302, the same test pattern as the gradation test pattern used in the first gradation adjustment is read from the storage unit of the gradation adjusting unit 51.

In ACT303, the read gradation test pattern is transferred onto the transfer belt 30 using the gradation correction table set in ACT301. The transfer method at this time is the same as that was used in the first gradation adjustment, that is, the gradation test pattern is transferred onto the transfer belt 30 using the second special transfer method.

In ACT304, the density sensor 35 detects the density for every gradation of the gradation test pattern on the transfer belt 30.

In ACT305, it is determined whether or not the detected density for every gradation is within a predetermined range of the 'reference gradation density' acquired and stored in the first gradation adjustment.

If the detected density is within the predetermined range, the processing ends.

In ACT306, if the detected density is outside the predetermined range, the gradation correction table is changed and updated such that the detected density for every gradation falls within the 'reference gradation density' acquired and stored in the first gradation adjustment.

Figure 13:
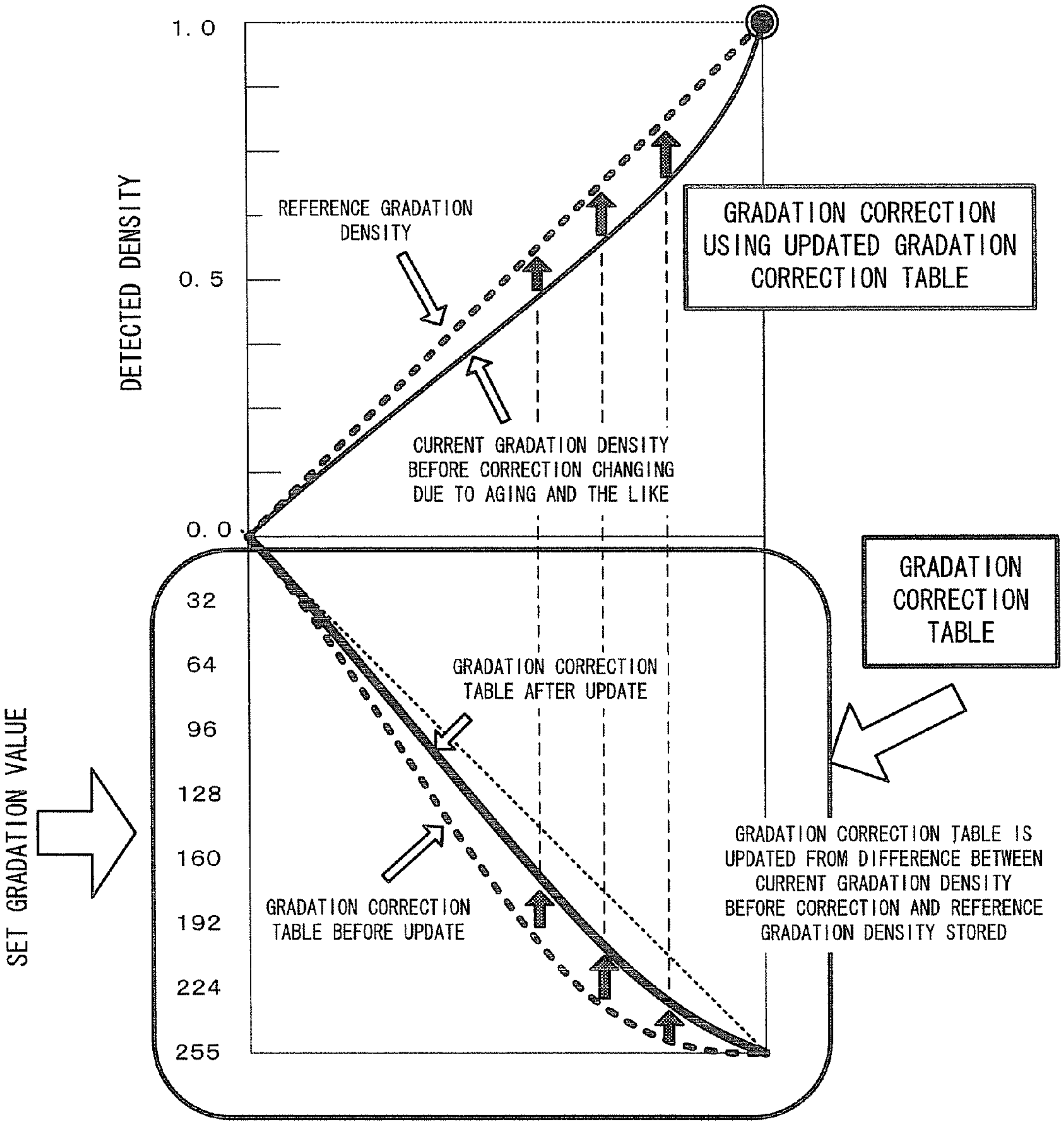
FIG. 13 is a view illustrating how a gradation correction table is updated in the second gradation adjustment.

FIG. 13 is a view illustrating the concept of update of the gradation correction table in the second gradation adjustment. For example, a difference between the density detected in ACT304 and the 'reference gradation density' is calculated, and a gradation correction table is updated on the basis of the difference for every set gradation value. By using the updated gradation correction table, it becomes possible to maintain the gradation characteristic, which deviates due to the ambient environment or the temporal change, in the predetermined range of the 'reference gradation density'.

As described above, according to the image forming apparatus 1 and the image forming method according to the present embodiment, adjustments to the desired density and the desired gradation can be performed simultaneously and accurately without giving an operation burden to a user even when the density or gradation characteristic changes with the aging or the ambient environment.

The invention is not limited to the embodiment described above but may be embodied in practice by modifying constituent components without departing from the scope and spirit of the invention. In addition, various kinds of embodiments of the invention may be realized by proper combination of the plurality of constituent components disclosed in the embodiment described above. For example, some constituent components may be eliminated from all components shown in the above embodiment. In addition, a constituent component in another embodiment may also be appropriately combined.

What is claimed is:

1. An image forming apparatus that forms a color image by overlapping a plurality of colors, comprising:

a scanner configured to read a document and generates image data;

an image processing unit configured to correct gradation of the image data using gradation correction data and generate a gradation image of the image data with gradation after correction;

a plurality of photoconductors corresponding to the plurality of colors;

a plurality of charging units configured to electrically charge the plurality of photoconductors with a predetermined charged potential;

a plurality of exposure units configured to expose the plurality of photoconductors with a predetermined exposure amount;

a plurality of development units configured to develop the plurality of photoconductors with a predetermined development potential;

a developer included in each of the plurality of the development units;

a transfer body onto which images corresponding respectively to the plurality of colors formed on the plurality of photoconductors are transferred;

a plurality of transfer units configured to transfer the images corresponding respectively to the plurality of colors from the plurality of photoconductors onto the transfer body;

a sensor configured to detect a density of an image formed on the transfer body;

a density adjusting unit configured to form a predetermined density test pattern on the transfer body and adjust process parameters including more than or equal to two among the charged potential, the exposure amount, the development potential, and a toner concentration of the developer such that a density of the density test pattern on the transfer body detected by the sensor falls within a predetermined range of a reference density; and a gradation adjusting unit configured to form a gradation test pattern having a plurality of gradation levels on the transfer body and update the gradation correction data such that a density for every gradation of the gradation test pattern on the transfer body detected by the sensor falls within a predetermined range of a reference gradation density acquired and stored beforehand, wherein the gradation adjusting unit updates the gradation correction data subsequently after the density adjusting unit adjusts the density of the density test pattern.

2. The apparatus according to claim 1, wherein the reference gradation density is reference data acquired and stored in adjustment using the scanner, and in the adjustment using the scanner, the gradation test pattern is printed on paper, the gradation test pattern printed on the paper is read by the scanner and the density of the gradation test pattern is detected by the scanner, the gradation correction data in the adjustment using the scanner is generated such that the density for every gradation in the gradation test pattern detected by the scanner falls within a predetermined range of a standard gradation density, gradation of image data of the gradation test pattern read by the scanner is corrected by using the gradation correction data generated in the adjustment using the scanner, the gradation test pattern subjected to gradation correction is formed on the transfer body, the density of the gradation test pattern formed on the transfer body is detected and acquired by the sensor, and the acquired density of the gradation test pattern is set as the reference gradation density and the reference gradation density is stored together with the corresponding gradation correction data.

3. The apparatus according to claim 2, wherein the adjustment using the scanner is an adjustment performed by an operator's instruction after the density adjusting unit adjusts the density of the test pattern.

4. The apparatus according to claim 1, wherein the density adjustment performed by the density adjusting unit and the update of the gradation correction data performed by the gradation adjusting unit are performed automatically and periodically on the basis of an operating time.

5. The apparatus according to claim 1, wherein the density adjustment performed by the density adjusting unit and the update of the gradation correction data performed by the gradation adjusting unit are automatically performed if a difference in at least one of temperature and humidity between a present time and a time when the last density adjustment is performed and the gradation correction data is updated exceeds a predetermined range.

6. The apparatus according to claim 1, wherein the transfer body is a transfer belt that sequentially transfers an image from an upstream side toward a downstream side, the image being formed on each of the photoconductors corresponding to the respective colors, the density adjusting unit controls the charging units, the exposure units, the development units, the transfer units, and the toner concentration such that the density test pattern corresponding to each of the colors is transferred onto the transfer belt without overlapping each other, and in this control, the density adjusting unit applies a predetermined transfer potential to each of the transfer units such that the density test patterns are simultaneously transferred from each of the photoconductors onto the transfer belt and controls each of the transfer units such that the transfer potential of each transfer unit becomes a neutral potential before the density test pattern transferred at the upstream side of the transfer belt reaches a transfer position of the adjacent transfer unit at the downstream side.

7. The apparatus according to claim 1, wherein the transfer body is a transfer belt that sequentially transfers an image from an upstream side toward a downstream side, the image being formed on each of the photoconductors corresponding to the respective colors, the gradation adjusting unit controls the charging units, the exposure units, the development units, the transfer units and the toner concentration such that the gradation test pattern corresponding to each of the colors is transferred onto the transfer belt without overlapping each other, and in this control, the gradation adjusting unit applies a predetermined transfer potential to each of the transfer units such that the gradation test patterns are simultaneously transferred from each of the photoconductors onto the transfer belt and controls each of the transfer units such that the predetermined transfer potential is applied until the density test pattern transferred at the most upstream side of the transfer belt passes through a transfer position of the transfer unit at the most downstream side.

8. The apparatus according to claim 1, wherein the density adjusting unit repeatedly executes a procedure of adjusting the process parameters until the density of the density test pattern detected by the sensor falls within the predetermined range of the reference density, and the gradation adjusting unit does not update the gradation correction data while the density adjusting unit is repeatedly executing the density adjustment.

9. The apparatus according to claim 1, wherein the gradation adjusting unit updates the gradation correction data once in a state where the adjusted process parameters are fixed after the density adjusting unit adjusts the density of the density test pattern, and does not update the updated gradation correction data until the process parameters are adjusted next.

10. The apparatus according to claim 1, wherein the plurality of colors are yellow (Y), magenta (M), cyan (C), and black (K).

11. An image forming method of forming a color image by overlapping a plurality of colors, comprising:

reading a document to generate image data by a scanner;

correcting gradation of the image data using gradation correction data and generating a gradation image of the image data with gradation after correction;

electrically charging a plurality of photoconductors corresponding to the plurality of colors with a predetermined charged potential;

exposing the plurality of photoconductors with a predetermined exposure amount;

developing the plurality of photoconductors with a predetermined development potential and a predetermined toner concentration in a developer;

transferring, onto a transfer body, images corresponding to each of the plurality of colors formed on the plurality of photoconductors;

detecting a density of an image formed on the transfer body using a sensor;

adjusting density of a density test pattern by forming a predetermined density test pattern on the transfer body and adjusting process parameters including more than or equal to two among the charged potential, the exposure amount, the development potential, and the toner concentration such that the density of the density test pattern on the transfer body detected by the sensor falls within a predetermined range of a reference density; and after adjusting the density of the density test pattern, forming a gradation test pattern having a plurality of gradation levels on the transfer body and updating the gradation correction data such that a density for every gradation of the gradation test pattern on the transfer body detected by the sensor falls within a predetermined range of a reference gradation density acquired and stored beforehand.

12. The method according to claim 11, wherein the reference gradation density is reference data acquired and stored in adjustment using the scanner, and in the adjustment using the scanner, the gradation test pattern is printed on paper, the gradation test pattern printed on the paper is read by the scanner and the density of the gradation test pattern is detected by the scanner, the gradation correction data in the adjustment using the scanner is generated such that the density for every gradation in the gradation test pattern detected by the scanner falls within a predetermined range of a standard gradation density, the gradation of image data of the gradation test pattern read by the scanner is corrected by using the gradation correction data generated in the adjustment using the scanner, the gradation test pattern subjected to gradation correction is formed on the transfer body, the density of the gradation test pattern formed on the transfer body is detected and acquired by the sensor, and the acquired density of the gradation test pattern is set as the reference gradation density and the reference gradation density is stored together with the corresponding gradation correction data.

13. The method according to claim 12, wherein the adjustment using the scanner is an adjustment performed by an operator's instruction after the adjustment of the density of the test pattern.

14. The method according to claim 11, wherein the density adjustment and the update of the gradation correction data are performed automatically and periodically on the basis of an operating time.

15. The method according to claim 11, wherein the density adjustment and the update of the gradation correction data are automatically performed if a difference in at least one of temperature and humidity between a present time and a time when the last density adjustment is performed and the gradation correction data is updated exceeds a predetermined range.

16. The method according to claim 11, wherein the transfer body is a transfer belt that sequentially transfers an image from an upstream side toward a downstream side, the image being formed on each of the photoconductors corresponding to the respective colors, in the density adjustment, the density test pattern corresponding to each of the colors is transferred onto the transfer belt without overlapping each other, and in the transfer control, a predetermined transfer potential is applied such that the density test patterns are simultaneously transferred from each of the photoconductors onto the transfer belt, and a control is made such that each of the transfer potential becomes a neutral potential before the density test pattern transferred at the upstream side of the transfer belt reaches an adjacent transfer position at the downstream side.

17. The method according to claim 11, wherein the transfer body is a transfer belt that sequentially transfers an image from an upstream side toward a downstream side, the image being formed on each of the photoconductors corresponding to the respective colors, in the gradation adjustment, the gradation test pattern corresponding to each of the colors is transferred onto the transfer belt without overlapping each other, and in the transfer control, a predetermined transfer potential is applied such that the gradation test patterns are simultaneously transferred from each of the photoconductors onto the transfer belt, and a control is made such that the predetermined transfer potential is applied until the density test pattern transferred at the most upstream side of the transfer belt passes through a transfer position at the most downstream side.

18. The method according to claim 11, wherein in the density adjustment, a procedure of adjusting the process parameters are repeatedly executed until the density of the density test pattern detected by the sensor falls within the predetermined range of the reference density, and in the gradation adjustment, the gradation correction data is not updated while the density adjustment is being repeatedly executed.

19. The method according to claim 11, wherein in the gradation adjustment, the gradation correction data is updated once in a state where the adjusted process parameters are fixed after the density of the density test pattern is adjusted, and the updated gradation correction data is not updated until the process parameters are adjusted next.

20. The method according to claim 11, wherein the plurality of colors are yellow (Y), magenta (M), cyan (C), and black (K).

* * * * *